(12) United States Patent
Riedmüller

(10) Patent No.: US 8,089,275 B2
(45) Date of Patent: Jan. 3, 2012

(54) SENSOR ARRANGEMENT, INTEGRATED CHIP COMPONENT WITH THE SENSOR ARRANGEMENT, AND MEASUREMENT METHOD

(75) Inventor: Kurt Riedmüller, Unterpremstätten (AT)

(73) Assignee: austriamicrosystem AG, Unterpremstätten (AT)

( * ) Notice: Subject to any disclaimer, the term of this patent is extended or adjusted under 35 U.S.C. 154(b) by 481 days.

(21) Appl. No.: 12/407,185

(22) Filed: Mar. 19, 2009

(65) Prior Publication Data

US 2009/0243606 A1   Oct. 1, 2009

(30) Foreign Application Priority Data

Mar. 26, 2008 (DE) .......................... 10 2008 015 698

(51) Int. Cl.
*G01R 31/02* (2006.01)
*G01B 7/14* (2006.01)

(52) U.S. Cl. .................................. 324/244; 324/207.24

(58) Field of Classification Search .................. None
See application file for complete search history.

(56) References Cited

U.S. PATENT DOCUMENTS

| 4,737,710 | A | 4/1988 | Van Antwerp et al. |
| 5,568,048 | A | 10/1996 | Schroeder et al. |
| 6,573,710 | B1 * | 6/2003 | Santos et al. ............. 324/207.25 |
| 6,891,364 | B2 * | 5/2005 | Boie et al. ................ 324/207.19 |
| 7,906,961 | B2 * | 3/2011 | Abwa et al. ..................... 324/251 |
| 2006/0043963 | A1 | 3/2006 | Kaneyasu et al. |
| 2011/0025313 | A1 * | 2/2011 | Zangl et al. ............. 324/207.25 |

FOREIGN PATENT DOCUMENTS

| DE | 10 2004 015 205 | 10/2005 |
| EP | 2163854 A1 * | 3/2010 |

* cited by examiner

Primary Examiner — Jermele M Hollington

(74) Attorney, Agent, or Firm — Cozen O'Connor

(57) ABSTRACT

A sensor arrangement has a sensor array (SA) with a first, a second, and a third sensor focus (SSP1, SSP2, SSP3), which are located along a main linear direction (L) and in which the third sensor focus (SSP3) is located in the middle between the first and second sensor foci (SSP1, SSP2). Individual sensor devices (SM1, SM2, SM3) with magnetic field sensors that provide a first, second, and third set of sensor signals are correlated with the sensor foci (SSP1, SSP2, SSP3). A first and a second channel signal (CH1, CH2) are derived as a function of the sets of sensor signals in a processing device (PRC) via a first and a second combination device (K1, K2). An evaluation unit (EV) is configured to derive a phase angle as a function of the channel signals (CH1, CH2).

17 Claims, 4 Drawing Sheets

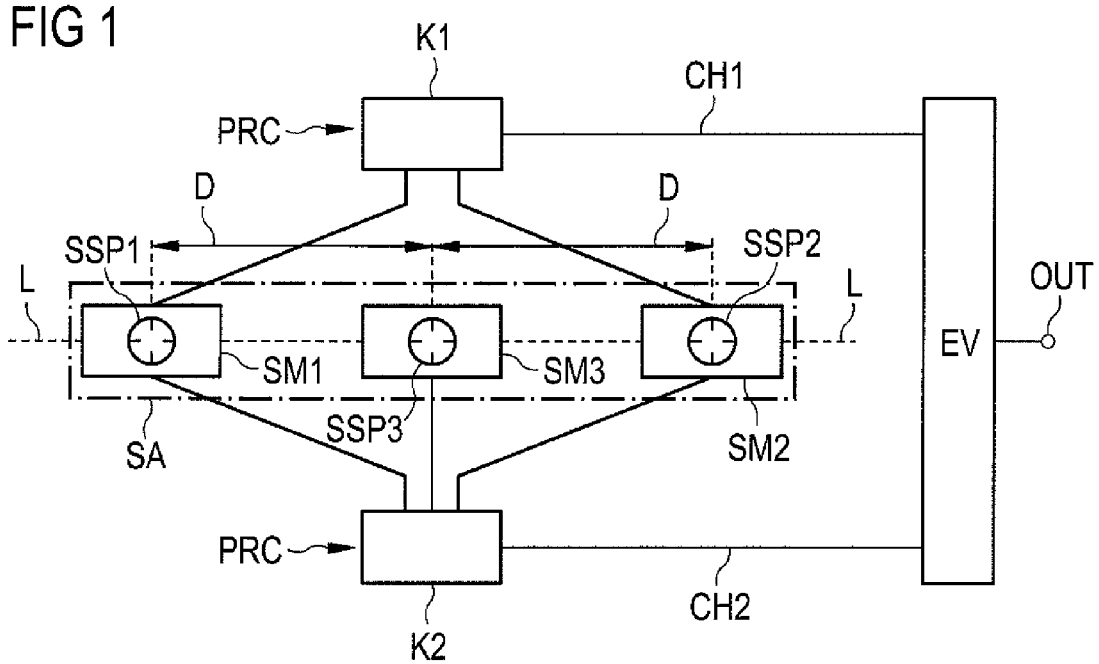
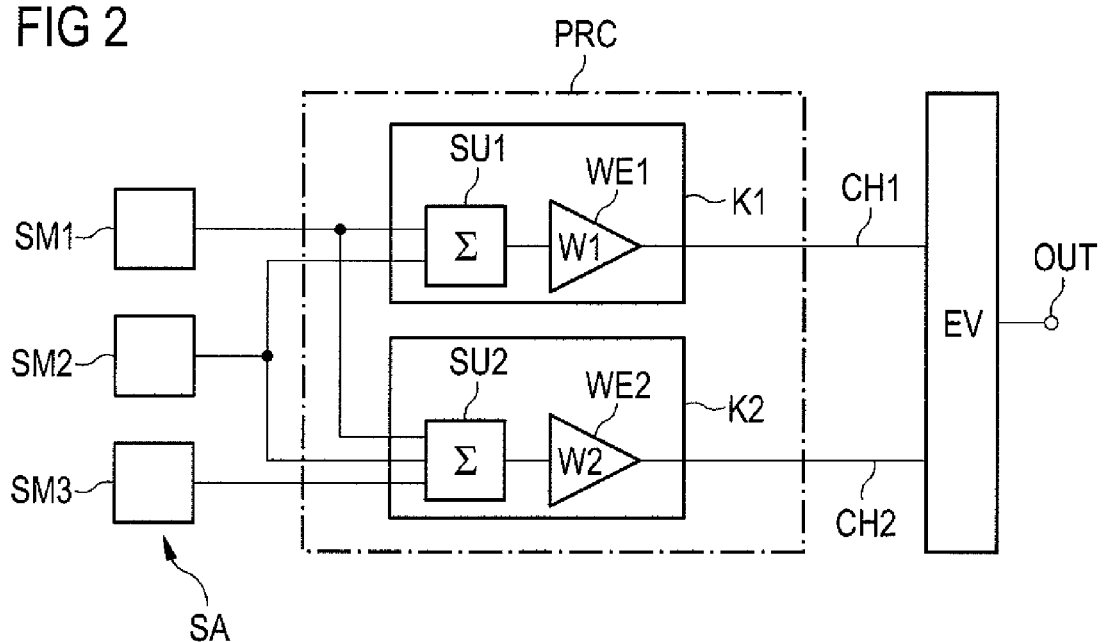

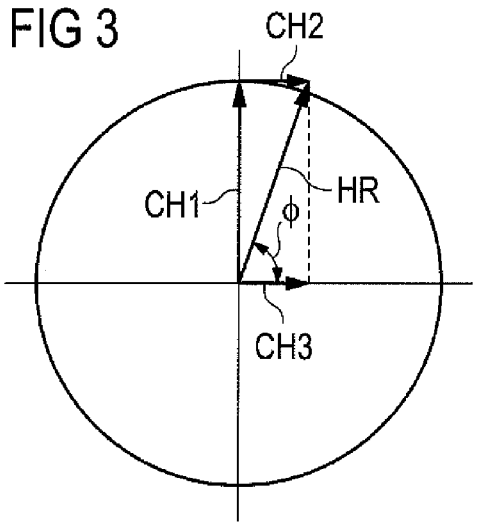
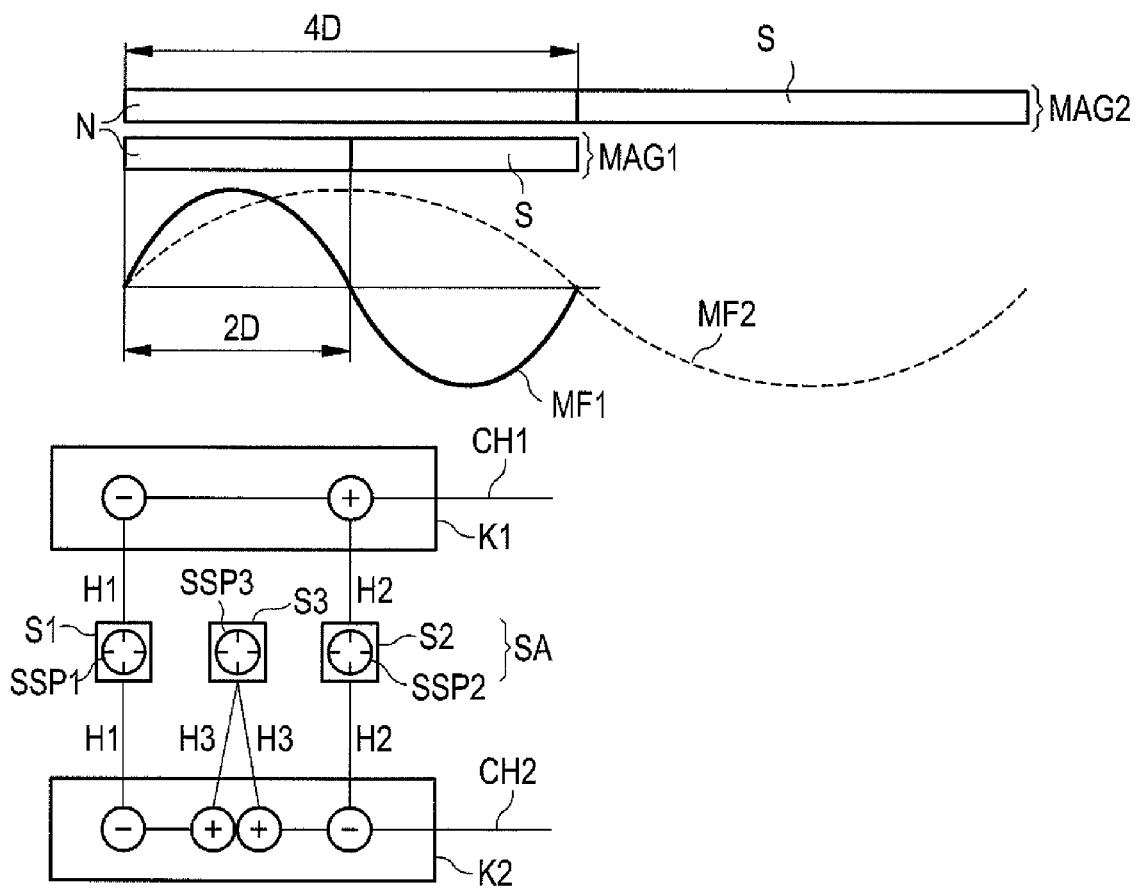

SENSOR ARRANGEMENT, INTEGRATED CHIP COMPONENT WITH THE SENSOR ARRANGEMENT, AND MEASUREMENT METHOD

RELATED APPLICATION

This application claims the priority of German patent application no. 10 2008 015 698.1 filed Mar. 26, 2008, the entire content of which is hereby incorporated by reference.

FIELD OF THE INVENTION

The invention concerns a sensor arrangement that can be used with a magnet source with magnetic poles of alternating polarity, and an integrated chip component with such a sensor arrangement. The invention also concerns a measurement method for the determination of a phase angle as a function of a position of a magnet source.

BACKGROUND OF THE INVENTION

Magnetic strips or magnetic rings with at least two alternating north and south poles are used for a contactless position measurement of linear, moved or rotating parts. These magnetic strips or rings are then firmly connected to the moved parts and are moved at a small distance over a magnetic field sensor. If a precise position measurement in a specific resolution is required, the magnetic field sensor can also consist of an array of several individual sensors. One can thereby make use of the fact, for example, that the vertical magnetic field component has a sine-shaped curve over the magnetic strip.

For the position determination, the sensors can be placed in such a manner that the sine-shaped field curve is measured on at least two sites with a distance corresponding to one-fourth of the length of the pole pair, which corresponds to a phase difference of 90° in the field curve. Thus, signals shifted 90° with respect to one another are produced. The actual position determination is regularly carried out in this case by means of a ratio determination of these two signals and the utilization of angle functions. An absolute position of the magnet source can be determined hereby within the measured pole pair.

With such a method, however, static magnetic fields can influence measured signals in such a way that a position determined from the signals is fraught with errors. Moreover, an arrangement in which corresponding magnetic field sensors are arranged at a stationary distance to one another can be used only with magnet sources of a pole length determined by this distance. Since the position determination is carried out as an absolute value only in the area of the length of a pole pair, the absolute measurement range is also limited with traditional arrangements of this type.

SUMMARY OF THE INVENTION

It is an object of the invention to specify a sensor arrangement, an integrated chip component with the sensor arrangement, and a measurement method for the determination of a phase angle as a function of a magnetic field, which make possible a more flexible and nonsensitive measurement.

An embodiment of a sensor arrangement comprises a sensor array with a first, a second, and a third sensor focus, which are arranged along a main linear direction. The third sensor focus is thereby placed in the middle between the first and the second sensor foci, so that, for example, an individual distance between the first and third sensor foci or the second and third sensor foci is equally large. The sensor array has, moreover, a first, a second, and a third sensor device, which are correspondingly allocated to the first, second, and third sensor foci and individually comprise at least one magnetic field sensor, which is configured so as to provide a sensor signal as a function of a magnetic field strength. An arrangement of the first, second, and third sensor device is done in such a manner that a geometric focus of the at least one magnetic field sensor coincides with the respective allocated sensor focus. Expressed in another way, each one of the sensor devices with one or more magnetic field sensors is allocated to a respective one of the sensor foci. The first, second, and third sensor devices are hereby configured to provide a first, second, and third set of sensor signals.

The sensor arrangement also comprises a processing device that has a first and a second combination device. The first combination device is configured to derive a first channel signal as a function of the first and second set of sensor signals while the second combination device is configured to derive a second channel signal as a function of the first, second, and third set of sensor signals. The first channel signal thus depends on sensor signals that are correlated with the first and second sensor focus, whereas the second channel signal represents a function of sensor signals that are detected at the three sensor foci. An evaluation unit in the sensor arrangement is configured to derive a phase angle as a function of the first and second channel signal.

The sensor arrangement is preferably configured for use with a magnetic strip or a magnetic ring with at least two or more magnetic poles of alternating polarity. Alternatively, other magnet sources can also be used with similar magnetic field distribution. An alignment of the pole curve is preferably provided in agreement with the main linear direction. In this case, a position of the magnet source with reference to the sensor array can be determined from the phase angle determined from the evaluation unit.

The relationships of the positions of the sensor foci with reference to the magnetic field distribution with respect to one another can be utilized by the arrangement of the magnetic field sensors in the sensor device on the sensor foci or by combining corresponding sensor signals, relative to a sensor focus. For example, the distance between the first and second sensor foci corresponds approximately to a phase angle of 180° with a sine-shaped magnetic field curve. Accordingly, sensor signals correlated with the third sensor focus are shifted by 90° with respect to the sensor signals of the first and second sensor foci. These phase relations can be utilized for the first channel signal, for example, by subtracting from the sensor signals correlated with the first sensor focus the sensor signals correlated with the second sensor focus. Since with a sine-shaped curve of a signal, a phase shift of 180° essentially corresponds to a reversal of the polarity sign, an approximate doubling of the absolute amount of the signals on the first or the second sensor foci therefore follows from the subtraction. By the subtraction, however, static magnetic field fractions are also calculated out, for example, of a homogeneous magnetic field that acts uniformly on all magnetic field sensors of the sensor arrays.

For the second channel signal, for example, it is possible to add up the sensor signals of the first and second sensor foci, which, under the assumption of an equal number of sensor signals and with reference to the phase relations listed above, leads essentially to an elimination or cancellation of the sensor signals. Furthermore, for the second channel signal, there is a difference between these added sensor signals of the first and second sensor foci and the sensor signals of the third sensor focus. If the number of the third set of sensor signals on the third sensor focus corresponds to the combined number of sensor signals of the first and second sets of sensor signals on the first and second sensor foci, the influences of a static magnetic field by the subtraction are, once again, cancelled, as in the case of the first channel signal. Moreover, there is a phase relation of essentially 90° between the first and the second channel signals; it is utilized for the determination of the phase angle of the sine-shaped magnetic field with reference to the sensor array.

With the described embodiment of the sensor array, it is thus possible to use the measurements of sensor signals at merely three positions for a phase angle determination or position determination with a high accuracy and with reduced disturbing influence by a static magnetic field. The derivation of the phase angle or a position can thus take place in a flexible and nonsensitive manner.

In one embodiment of the sensor arrangement, the first and/or the second combination device(s) is/are configured to determine the individual channel signal, as a function of a weighting factor. Physical deviations of a pole length of the used magnet source and thus a different period length of the sine-shaped magnetic field curve can be computationally balanced by a different weighting of the first and second channel signals. For example, the evaluation unit is configured to determine the phase angle via an arc tangent function, as a function of a ratio of the first and second channel signals. To this end, the first and the second channel signals should preferably have a phase distance of 90°. By the weighting factors, it is possible to take into consideration changed geometric relations in the angle calculation with the arc tangent function. Thus, such a sensor arrangement can also be used for different magnet sources with different pole lengths, although the physical distance between the sensor points is fixed. Expressed in a different manner, the absolute measurement range of the sensor arrangement with reference to the distance between the sensor foci can be increased by the weighting factors. This further supports the flexible use of the described sensor arrangement.

In different embodiments, the arc tangent function can be carried out by means of a traditional, preferably digital calculation. Alternately, the arc tangent function can also be executed via a reference table, via an analog/digital converter whose conversion behavior has a curve corresponding to the arc tangent function, or via a coordinate rotation digital computer, CORDIC.

In one embodiment of the sensor arrangement, the first, second and the third sensor device each has precisely one magnetic field sensor. Expressed in another manner, the first, the second, and the third sets of sensor signals each has exactly one sensor signal, which is provided by the corresponding magnetic field sensor. The first combination device is thereby configured to determine the first channel signal as a function of a difference between the sensor signal of the first sensor device and the sensor signal of the second sensor device. The second combination device is configured to determine the second channel signal as a function of a difference between a double-weighted sensor signal of the third sensor device and a sum of the sensor signals of the first and second sensor devices.

Thus, only three magnetic field sensors are needed for this embodiment, whose sensor signals during the operation by the combination device are correspondingly combined to form the channel signals. For the compensation of static magnetic fields, the sensor signal of the third sensor device is double-weighted in the determination of the second channel signal, so that, in turn, static influences of a magnetic field cancel each other.

In another embodiment example of a sensor arrangement, the first and the second sensor device each comprises exactly one magnetic field sensor, whereas the third sensor device comprises exactly two magnetic field sensors. The two magnetic field sensors of the third sensor device are arranged thereby in such a way that their geometric focus coincides with the third sensor focus. Each of the first and second sets of sensor signals accordingly comprises exactly one sensor signal, whereas the third set of sensor signals comprises the two sensor signals of the two magnetic field sensors of the third sensor device. The first combination device is configured in this case to determine the first channel signal as a function of a difference between the sensor signal of the first sensor device and the sensor signal of the second sensor device. Accordingly, the second combination device is configured to determine the second channel signal as a function of a difference between added sensor signals of the third sensor device and a sum of the sensor signals of the first and second sensor devices. Expressed in other words, the sensor signals of the first and second sensor devices are added and used for a subtraction with a sum of the sensor signals of the third sensor device. In this case also, the influence of static magnetic fields is compensated. A signal/noise ratio can be improved in the calculation of the second channel signal by using two independent magnetic field sensors for the third sensor device.

In another embodiment of the sensor arrangement, each of the first and the second sensor device comprises exactly two magnetic field sensors, whose geometric focus coincides with the corresponding sensor focus. The third sensor device in this case has exactly four magnetic field sensors in a corresponding arrangement around the third sensor focus. Here the first combination device is configured to determine the first channel signal as a function of a difference between the added sensor signals of the first sensor device and added sensor signals of the second sensor device. The second combination device is configured to determine the second channel signal as a function of a difference between the added sensor signals of the third sensor device and a sum of the added sensor signals of the first and second sensor devices. In this embodiment also, influences of a static magnetic field are compensated. In addition, the signal/noise ratio of the channel signals is improved by the increased number of individual magnetic field sensors, which leads to a further increased accuracy in the determination of the phase angle or a position of a magnet source.

A sensor arrangement according to one of the described embodiment examples can preferably be used as an integrated circuit in an integrated chip component. The integrated chip component thus has both the sensor array and also the processing device and the evaluation unit, so that at corresponding output connections of the chip component, a phase angle or a position of a magnet source, which is located above the chip component, can be directly provided. With such an integrated chip component and a corresponding magnet source, it is thus possible to build a corresponding measurement system with little expense.

An embodiment example of a measurement method comprises the providing of a sensor array with a first, a second, and a third sensor focus, which are located along a main linear direction and in which the third sensor focus is located in the middle between the first and the second sensor focus. Furthermore, a magnet source is provided with at least two magnetic poles of alternating polarity. With the sensor array, a first, a second, and a third set of sensor signals are produced as a function of a magnetic field strength. The first set is hereby allocated to the first sensor focus; the second set, with the second sensor focus; and the third set, with the third sensor focus. Thus, the sensor signals of the first, second, and third set depend on the individual magnetic field strength at the sensor foci. A first channel signal is derived as a function of the first and second sets of sensor signals, and a second channel signal is derived as a function of the first, the second, and the third sets of sensor signals. As a function of the first and second channel signals, a phase angle is determined. Preferably, the determination of the phase angle takes place via an arc tangent function as a function of a relationship of the first and second channel signals.

It is possible with the described method to determine a phase angle of the magnetic field curve of the magnet source, which corresponds to a position of the magnet source relative to the sensor array. Influences of a static magnetic field are hereby taken into consideration, so that a measurement result is not sensitive with respect to such disturbances.

The first and/or the second channel signal can be determined as a function of a weighting factor. Via the weighting factor, it is possible to compensate for deviations of a pole length of the magnet source used relative to distances between the sensor foci. Thus, the measurement method can be used in a flexible manner.

In one embodiment of the measurement method, the first channel signal is determined as a function of a difference between the sensor signal of the first set of sensor signals and sensor signals of the second set of sensor signals. A determination of the second channel signal takes place as a function of a difference between sensor signals of the third set of sensor signals and a sum of sensor signals of the first and second set of sensor signals.

As described previously in the embodiment examples of the sensor arrangement, the channel signals in this embodiment of the method can be combined from the individual sensor signals in such a way that the phase relation of the measured sensor signals is utilized optimally.

In various embodiments, the number of sensor signals in the individual sets can be correspondingly varied. The number of the first and second set of sensor signals should, however, correspond. At the same time, the number of sensor signals of the third set of sensor signals should correspond to the combined number of sensor signals of the first and second sets. By means of such a division of the sensor signals, it is possible to maintain a corresponding magnitude ratio that is favorable for a more accurate determination of the phase angle when the channel signals are combined.

BRIEF DESCRIPTION OF THE DRAWINGS

The invention is explained in more detail below with several embodiment examples with the aid of the figures. Elements with the same function or effect have the same reference symbols. If components correspond in their function, their description will not be repeated in each of the following figures.

The figures show the following:

FIG. 1, an embodiment example of a sensor arrangement;

FIG. 2, a block diagram of an embodiment of a sensor arrangement;

FIG. 3, a vector diagram with channel signals;

FIG. 4, a first embodiment detail of a sensor arrangement;

DETAILED DESCRIPTION OF THE DRAWINGS

Figure 5:
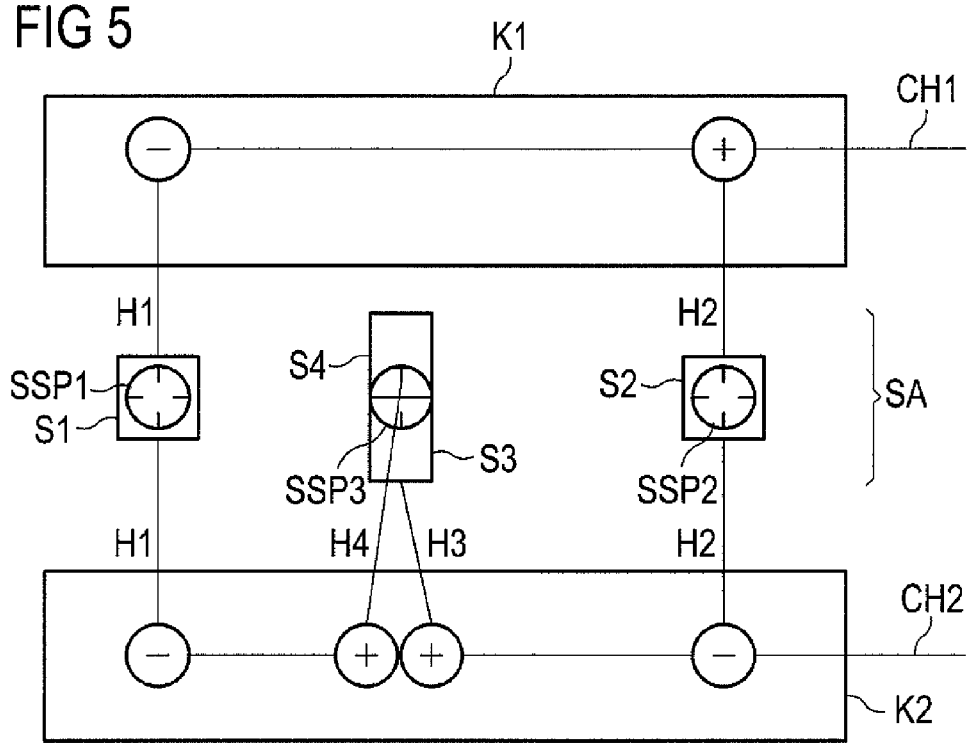
FIG. 5, a second embodiment detail of a sensor arrangement.

In FIG. 1, an embodiment example of a sensor arrangement with magnetic field sensors is depicted. The sensor arrangement comprises a sensor array SA with a main linear direction L, on which three sensor foci SSP1, SSP2, SSP3 are located. A distance D between the first sensor focus SSP1 and the third sensor focus SSP3 corresponds to that between the second sensor focus SSP2 and the third sensor focus SSP3. Expressed in other words, the third sensor focus SSP3 is located in the middle between the first and the second sensor foci SSP1, SSP2. The sensor array comprises a first, a second, and a third sensor device SM1, SM2, SM3, which respectively comprise at least one magnetic field sensor configured to provide a sensor signal as a function of a magnetic field strength. The magnetic field sensors are not depicted in FIG. 1 for reasons of clarity.

The first sensor device SM1 is located in the depicted embodiment example in such a way that a geometric focus of the magnetic field sensor or the magnetic field sensors of the first sensor device SM1 coincides with the first sensor focus SSP1. Accordingly, the second sensor device SM2 is allocated to the second sensor focus SSP2, wherein, likewise, the geometric focus of the comprised magnetic field sensors coincides with the sensor focus SSP2. This is also valid in an analogous manner for the third sensor device SM3, which is allocated to the third sensor focus SSP3.

The sensor arrangement also comprises a processing device PRC, which has a first and a second combination device K1, K2. The first combination device K1 is coupled at the input with outputs of the first and second sensor devices SM1, SM2. An output of the first combination device K1 is connected to an evaluation unit EV to provide a first channel signal CH1. The second combination device K2 is coupled at the input with outputs of all three sensor devices SM1, SM2, SM3. Furthermore, an output of the second combination device K2, in turn, is connected to the evaluation unit EV, so as to be able to provide, in this case, during operation, a second channel signal CH2. The evaluation unit EV, moreover, has an output OUT.

The depicted sensor arrangement is preferably provided for use with a magnet source with two or more magnetic poles of alternating polarity, which is oriented along the main linear direction L. For example, a magnetic strip or a magnetic ring with several magnetic poles can be used as a magnet source. A magnet source is likewise not depicted in FIG. 1 for reasons of clarity. A magnet source of the described type, however, produces a sine-shaped magnetic field curve along the main linear direction L; this curve can be detected by the magnetic sensors of the sensor devices SM1, SM2, SM3 at the corresponding positions characterized by the sensor foci SSP1, SSP2, SSP3. For example, a distance 2D, between the first and the second sensor foci SSP1, SSP2, resulting from a doubling of the distance D, corresponds to the length of a pole of the magnet source or half the length of a pair of poles. In this case, a distance D corresponds to a phase difference of 90° in the curve of the sine-shaped magnetic field of the magnet source along the main linear direction L. This phase relation can be used for the further processing of the sensor signals.

In the embodiment example under consideration, the first channel signal CH1 in the first combination device K1 is determined from sensor signals of the first and second sensor devices SM1, SM2, taking into consideration their phase position. In a similar manner, during operation of the sensor arrangement, the second channel signal CH2 from the second combination device K2 is determined from sensor signals of the first, second, and third sensor devices SM1, SM2, SM3. The channel signals CH1, CH2 are processed in the evaluation unit EV, so as to determine a phase angle, which is provided, for example, at the output OUT.

For example, the first and second channel signals CH1, CH2 are set in relation to one another in the evaluation unit EV and from the determined relationship by means of an arc tangent function, the phase angle is determined, which can be provided at the output OUT. For the calculation, the evaluation unit EV can have, for example, a microcontroller, which carries out the arc tangent function by means of a traditional digital calculation. Alternately, the evaluation unit EV can also have a reference table in which values for the arc tangent function are given. As another alternative, the evaluation unit EV can have an analog/digital converter, whose conversion behavior has a curve that corresponds to the arc tangent function and with which, on the input side, the first and second channel signals CH1, CH2 are correlated in analogous form. Moreover, the evaluation unit EV can also have a coordinate rotation digital computer, CORDIC, via which the angle calculation is carried out.

FIG. 2 shows a block diagram of an embodiment of the sensor arrangement. In this embodiment, each combination device K1, K2 has respective addition elements SU1, SU2, and respective weighting elements WE1, WE2. In this block diagram, the sensor devices SM1, SM2, SM3 are not depicted with reference to the individually coordinated sensor foci SSP1, SSP2, SSP3. The first addition element SU1 in the first combination device KM1 is coupled on the input side with the first and second sensor devices SM1, SM2 to convey one or more sensor signals from the sensor devices SM1, SM2. The second addition element SU2 in the second combination device K2 has three inputs, which are coupled with one of the sensor devices SM1, SM2, SM3. Weighting elements WE1, WE2 are downstream in the combination device K1, K2 from the addition elements SU1, SU2; the weighting elements weight a result or an output signal of the additional elements SU1, SU2 with individual weighting factors W1, W2, so as to derive the first and the second channel signal CH1, CH2.

Depending on the number of magnetic field sensors that are individually comprised by the sensor devices SM1, SM2, SM3, one or more sensor signals can be provided to the addition elements SU1, SU2. The addition elements SU1, SU2 should not here be understood as pure addition elements, but rather as general addition elements, to which both positively weighted and negatively weighted sensor signals can be conveyed. Expressed in a different manner, differences in corresponding adjacent sensor signals on the input side are also formed via the addition elements SU1, SU2. Preferably, therefore, a difference between sensor signals of the first set of sensor signals provided by the sensor device SM1 and sensor signals of the second set of sensor signals provided by the sensor device SM2 is determined by the first addition element SU1. Here, it is initially irrelevant whether sensor signals of the first set of sensor signals are subtracted from the second set or vice-versa.

With the second summation element SU2, a difference is determined between the sensor signals of the third set of sensor signals provided by the third sensor device SM3, and a sum of sensor signals of the first and second sets of sensor signals. Expressed differently, the sensor signals of the first and second sets with the same sign enter into an addition result, which, however, is different from the sign of the sensor signals of the third set. With a corresponding pole length of the used magnet source, with reference to the distance between the sensor foci SSP1, SSP2, SSP3, signals are present at the output of the addition elements SU1, SU2, which have a phase shift of 90° with respect to one another. With a different pole length of the magnet source, however, an adaptation of the addition result, which takes into consideration the changed pole length for the subsequent determination of the phase angle in the evaluation unit, can take place with different weighting factors W1, W2.

FIG. 3 shows a vector diagram with the first and second channel signals CH1, CH2, which are depicted in a unit circle with a correspondingly assumed orientation. Here, the second channel signal is, for example, depicted as a cosine fraction of a resulting vector HR, which is produced from the vector sum of the first and second channel signals. Accordingly, the first channel signal CH1 is a sine fraction of this resulting vector HR. An angle φ, with reference to the reference axes of the unit circle, can be determined via trigonometric functions from the values of the first and second channel signals CH1, CH2, for example, via an arc tangent function. Expressed as a formula, the result is accordingly as follows:

$$\Phi = \arctan\frac{CH1}{CH2},$$

wherein the signs in the formula can be taken into consideration in an arbitrarily different manner. Moreover, the channel signals CH1, CH2 can also be switched in the formula.

FIG. 4 shows a detail implementation of a sensor arrangement, which can be used, for example, in the embodiment example shown in FIG. 1. In addition, two magnet sources MAG1, MAG2, with corresponding magnetic field courses MF1, MF2, are depicted by way of example. A sensor arrangement in one of the described embodiments is operated with only one magnet source in spite of the depiction by way of example of two magnet sources MAG1, MAG2. Each of magnet sources MAG1, MAG2 has a magnetic north pole N and a magnetic south pole S, wherein each of the poles of the first magnet source MAG1 has a pole length of 2D and each of the poles of the second magnet source MAG2, a pole length of 4D. Here, D is the distance, depicted in FIG. 1, between the sensor foci SSP1, SSP2, SSP3. Accordingly, the distance between the first and second sensor foci SSP1, SSP2 in FIG. 4 also amounts to the distance 2D.

Relative to the first magnetic field curve MF1, which is produced by the first magnet source MAG1, this distance 2D corresponds to a phase difference of 180°. For the second sine-shaped magnetic field curve MF2, which is produced by the second magnet source MAG2, the distance 2D corresponds, on the other hand, only to a phase difference of 90°.

The following embodiments should refer first to the first magnetic field curve MF1, in which the distance 2D corresponds to a phase difference of 180°. In the embodiment example under consideration, the first sensor device is a single magnetic field sensor S1, which is located on the first sensor focus SSP1. Accordingly, the second sensor device comprises a magnetic field sensor S2, which is located on the second sensor focus SSP2. A single third sensor S3 is provided on the third sensor focus SSP3. Here, during the operation of the sensor arrangement of the first sensor S1, a first sensor signal H1 is provided; from the second magnetic field sensor S2, a second sensor signal H2; and from the third magnetic field sensor S3, a third sensor signal H3.

In the first combination device K1, the first channel signal CH1 is formed by a positively weighted sensor signal H2 and a negatively weighted sensor signal H1, which corresponds to a difference between the first and second sensor signals H1, H2. Since the first and second sensor signals H1, H2 are correlated with positions that have a phase difference of 180° with respect to one another with reference to the magnetic field MF1, this difference in the first channel signal CH1 essentially corresponds to a doubling of the amount of the corresponding signal at one of the positions SSP1, SSP2.

In the second combination device K2, the second channel signal CH2 results from two positively weighted third sensor signals H3 and negatively weighted first and second sensor signals H1, H2. Since the first and second sensor signals H1, H2 are weighted with the same sign and have the aforementioned phase difference, their values essentially cancel each other, so that the second channel signal CH2 predominantly or exclusively results from the third sensor signal H3. Here, the third sensor signal H3 is correlated with the third sensor focus SSP3, which corresponds to a phase difference of 90° relative to the magnetic field curve MF1.

Thus, the phase relation, which is graphically depicted in the vector diagram in FIG. 3, is produced between the first and second channel signals CH1, CH2. Accordingly, a phase angle of the magnet source MAG1 or its position can be determined in a simple manner via an arc tangent function from the first and second channel signals CH1, CH2.

If during the production of the sensor signals by the magnetic field sensors S1, S2, S3 a static magnetic field overlaps the magnetic field curve MF1, these static magnetic field fractions can be calculated out by subtraction both in the first and also in the second combination device K1, K2. This can be attributed, in particular, to the fact that the number of positively weighted sensor signals corresponds to the number of individually negatively weighted sensor signals in each of the channels.

If the pole length of the used magnet source differs from the pole length of the magnet MAG1, such as with the second magnet source MAG2, consideration can be taken of the changed pole length with a corresponding weighting of the channel signals CH1, CH2. Here, the channel signals CH1, CH2 are to be weighted in such a manner that the resulting signals again have a desired phase difference of essentially 90° with respect to one another. This weighting is, for example, depicted and described for FIG. 2.

FIG. 5 shows another detail of an embodiment example of a sensor arrangement. In this embodiment example, the third sensor device has exactly two magnetic field sensors S3, S4, which are placed in such a way that their geometric center coincides with the third sensor focus SSP3. The magnetic field sensors S1, S2 correspond to the embodiment depicted in FIG. 4.

Each of the magnetic field sensors S3, S4 provides a sensor signal H3, H4, which can be correlated with the third sensor focus SSP3. The first channel signal CH1 is determined as with the embodiment example in FIG. 4. Differing from the embodiment example of FIG. 4, the second channel signal CH2 is not determined by the double weighting of a sensor signal, but rather by a positive weighting of two sensor signals H3, H4. The first and second sensor signals H1 H2 enter in the second channel signal CH2, in turn, with a negative sign. The signal/noise ratio of the resulting channel signal CH2 is improved by the provision of two magnetic field sensors S3, S4. This can be attributed to the fact that with the addition of two independent sensor signals H3, H4, any noise that may appear is not introduced with as much weight into a total result as with a doubling of a noise-fraught sensor signal of an individual sensor.

Figure 6:
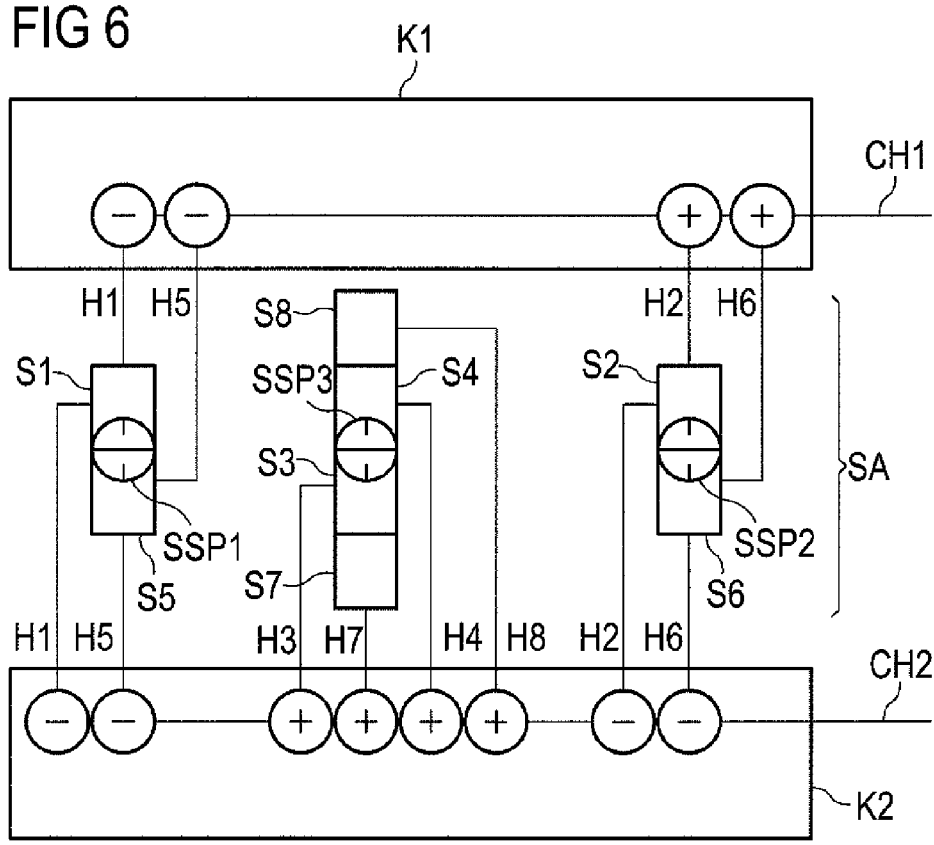
FIG. 6, a third embodiment detail of a sensor arrangement.

FIG. 6 shows a detail implementation of another embodiment of a sensor arrangement. Here, in comparison with the embodiment of FIG. 5, the number of magnetic field sensors at each of the sensor foci SSP1, SSP2, SSP3 is doubled. Accordingly, two magnetic field sensors S1, S5 are correlated in the first sensor focus SSP1; two magnetic field sensors S2, S6, to the second sensor focus SSP2; and four magnetic field sensors S3, S4, S7, S8, to the third sensor focus SSP3. The arrangement of the magnetic field sensors S1 to S8 takes place individually, alongside the main linear direction L, around the individual sensor foci SSP1 to SSP3.

Analogous to the embodiment example of FIG. 5, the sensor signals H1, H5 of the first and fifth magnetic field sensors S1, S5 for the first channel signal CH1 are negatively weighted, whereas sensor signals H2, H6 of the second and the sixth magnetic field sensor S2, S6 enter, positively weighted, into the first channel signal CH1. Likewise, the sensor signals H1, H2, H5, H6 of the magnetic field sensors S1, S2, S5, S6 enter, negatively weighted, into the second channel signal, whereas sensor signals H3, H4, H7, H8 of the magnetic field sensors S3, S4, S7, S8 are positively weighted. As with the previous embodiment example, the number of positively and negatively weighted sensor signals mutually corresponds in the channels, so that static magnetic field fractions compensate each other.

Figure 7:
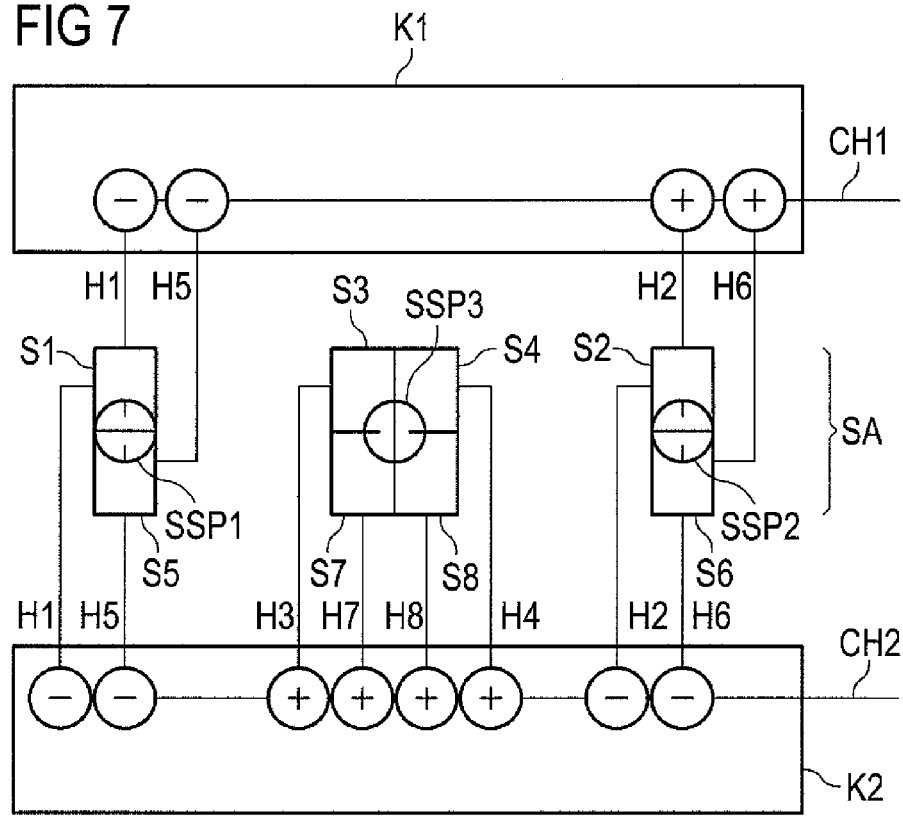
FIG. 7, a fourth embodiment detail of a sensor arrangement.

FIG. 7 shows a detailed implementation of another embodiment of a sensor arrangement, which corresponds, in the number of provided magnetic field sensors and the type of the addition of the resulting sensor signals, to the embodiment example depicted in FIG. 6. Differing from FIG. 6, however, the magnetic field sensors S3, S4, S7, S8 are located in a square around the third sensor focus SSP3, so that the magnetic field sensors S1 to S4 form a first line and the magnetic field sensors S5 to S8, a second line of the sensor array SA. In turn, a geometric focus of the magnetic field sensors is in agreement with the individually correlated sensor focus.

Figure 8:
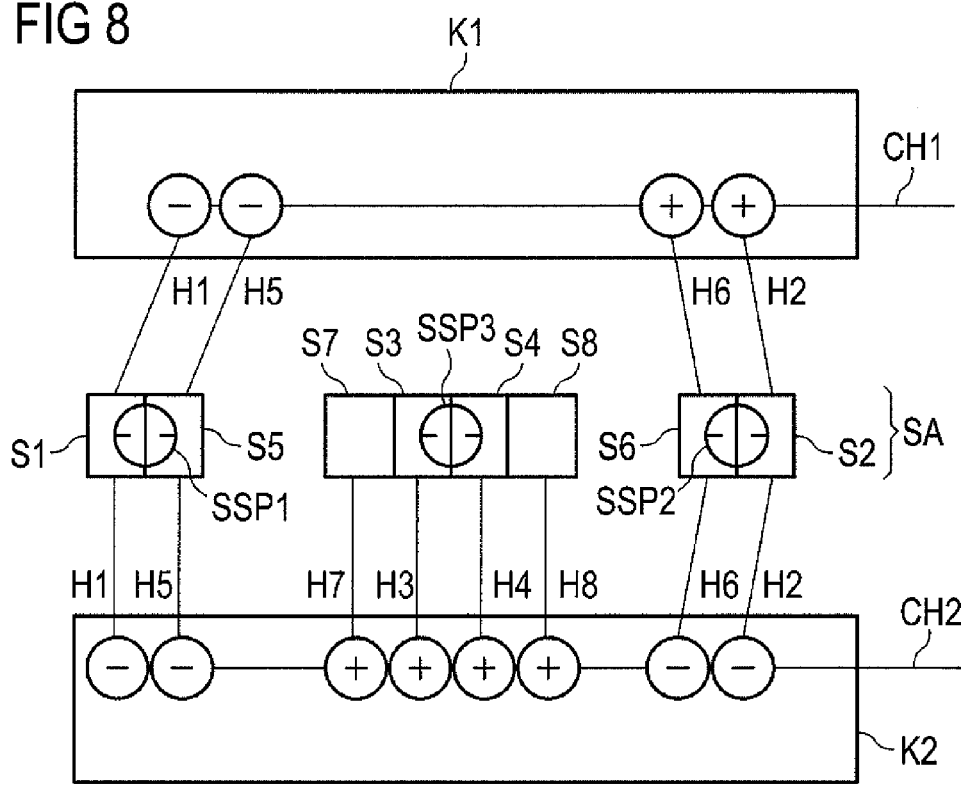
FIG. 8, a fifth embodiment detail of a sensor arrangement.

FIG. 8 shows a detailed implementation of another alternative embodiment example of a sensor arrangement. The number of magnetic field sensors in this embodiment example corresponds, in turn, to the number in the preceding embodiment examples, as well as the type of addition. In FIG. 8, the magnetic field sensors S1 to S8, however, are located next to one another, along the main linear direction L, wherein the agreement between the geometric focus of magnetic field sensors that belong together with the correlated sensor focus is also maintained for this embodiment example.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A sensor arrangement, comprising:
   a sensor array with a first, a second, and a third sensor focus, which are located along a main linear direction, wherein the third sensor focus is located in the middle between the first and second sensor focus, the sensor array having a first, a second, and a third sensor devices, which are allocated to the first, second, and third sensor focus and respectively comprise at least one magnetic field sensor, which is configured to provide a sensor signal as a function of a magnetic field strength, wherein the first, second, and third sensor devices are respectively located in such a way that a geometric focus of the at least one magnetic field sensor coincides with the respective allocated sensor focus, and wherein the first, second, and third sensor devices are configured to provide a first, second, and third set of sensor signals;
   a processing device, having a first combination device, which is configured to derive a first channel signal as a function of the first and second set of sensor signals, and a second combination device, which is configured to derive a second channel signal as a function of the first, the second, and the third set of sensor signals; and an evaluation unit, which is configured to derive a phase angle as a function of the first and second channel signals.

2. The sensor arrangement according to claim 1, which is configured for use with a magnetic strip or a magnetic ring with two or more magnetic poles of alternating polarity.

3. The sensor arrangement according to claim 1, in which the first and/or the second combination device(s) is/are configured to determine the individual channel signal as a function of a weighting factor.

4. The sensor arrangement according to claim 1, wherein the first combination device is configured to determine the first channel signal, as a function of a difference between the sensor signals of the first set of sensor signals and sensor signals of the second set of sensor signals; and wherein the second combination device is configured to determine the second channel signal as a function of a difference between sensor signals of the third set of sensor signals and a sum of sensor signals of the first and second set of sensor signals.

5. The sensor arrangement according to claim 1, wherein each of the first, second, and third sensor devices comprises exactly one magnetic field sensor;

wherein the first combination device is configured to determine the first channel signal as a function of a difference between the sensor signal of the first sensor device and the sensor signal of the second sensor device; and wherein the second combination device is configured to determine the second channel signal as a function of a difference between a doubly weighted sensor signal of the third sensor device and a sum of the sensor signals of the first and second sensor devices.

6. The sensor arrangement according to claim 1, wherein each of the first and second sensor devices comprises exactly one magnetic field sensor;

wherein the third sensor device exactly comprises two magnetic field sensors;

wherein the first combination device is configured to determine the first channel signal as a function of a difference between the sensor signal of the first sensor device and the sensor signal of the second sensor device; and wherein the second combination device is configured to determine the second channel signal as a function of a difference between added sensor signals of the third sensor device and a sum of the sensor signals of the first and second sensor devices.

7. The sensor arrangement according to claim 1, wherein each of the first and second sensor devices comprises exactly two magnetic field sensors;

wherein the third sensor device comprises exactly four magnetic field sensors;

wherein the first combination device is configured to determine the first channel signal as a function of a difference between added sensor signals of the first sensor and added sensor signals of the second sensor device; and wherein the second combination device is configured to determine the second channel signal as a function of a difference between added sensor signals of the third sensor device and a sum of the added sensor signals of the first and second sensor devices.

8. The sensor arrangement according to claim 1, wherein the evaluation unit is configured to determine the phase angle via an arc tangent function as a function of a relationship of the first and the second channel signals.

9. The sensor arrangement according to claim 8, wherein the evaluation unit is configured to execute the arc tangent function by means of at least one of the following: a calculation, a reference table, an analog-digital converter, a CORDIC.

10. An integrated chip component with a sensor arrangement according to claim 1.

11. A measurement method, comprising the steps of:
providing a sensor array with a first, a second, and a third sensor focus, which are located along a main linear direction and in which the third sensor focus is located in the middle between the first and second foci;
providing a magnet source with two or more magnetic poles of alternating polarity;
producing with the sensor array a first set of sensor signals as a function of a magnetic field strength, wherein the first set is allocated to the first sensor focus;
producing with the sensor array a second set of sensor signals as a function of a magnetic field strength, wherein the second set is allocated to the second sensor focus;
producing with the sensor array a third set of sensor signals as a function of a magnetic field strength, wherein the third set is allocated to the third sensor focus;
deriving a first channel signal as a function of the first and second set of sensor signals;
deriving a second channel signal as a function of the first, the second, and the third set of sensor signals; and
deriving a phase angle as a function of the first and second channel signal.

12. The measurement method according to claim 11, wherein the first and/or the second channel signal(s) is/are determined as a function of a weighting factor.

13. The measurement method according to claim 11, wherein the first channel signal is determined as a function of a difference between sensor signals of the first set of sensor signals and sensor signals of the second set of sensor signals; and wherein the second channel signal is determined as a function of a difference between sensor signals of the third set of sensor signals and a sum of sensor signals of the first and second sets of sensor signals.

14. The measurement method according to claim 11, comprising the steps of:
producing the first, second, and third set of sensor signals, each with exactly one sensor signal;
determining the first channel signal as a function of a difference between the sensor signal of the first set and the sensor signal of the second set; and
determining the second channel signal as a function of a difference between a doubly weighted sensor signal of the third set and a sum of the sensor signals of the first and second set.

15. The measurement method according to claim 11, comprising the steps of:
producing the first and second set of sensor signals, with exactly one sensor signal each;
producing the third set of sensor signals with exactly two sensor signals;
determining the first channel signal as a function of a difference between the sensor signal of the first set and the sensor signal of the second set; and determining the second channel signal as a function of a difference between added sensor signals of the third set and a sum of the sensor signals of the first and second set.

16. The measurement method according to claim 11, comprising the steps of:
- producing the first and second sets of sensor signals, with exactly two sensor signals each;
- producing the third set of sensor signals with exactly four sensor signals;
- determining the first channel signal as a function of a difference between added sensor signals of the first set and added sensor signals of the second set; and
- determining the second channel signal as a function of a difference between added sensor signals of the third set and a sum of the added sensor signals of the first and second sets.

17. The measurement method according to claim 11, wherein
the phase angle is determined via an arc tangent function as a function of a relationship of the first and second channel signals.

* * * * *